US010527310B2

(12) United States Patent
Nagaoka et al.

(10) Patent No.: US 10,527,310 B2
(45) Date of Patent: Jan. 7, 2020

(54) AIR CONDITIONER

(71) Applicant: DAIKIN INDUSTRIES, LTD., Osaka-Shi, Osaka (JP)

(72) Inventors: Shinji Nagaoka, Osaka (JP); Shigeharu Taira, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/532,728

(22) PCT Filed: Nov. 26, 2015

(86) PCT No.: PCT/JP2015/083288
§ 371 (c)(1),
(2) Date: Jun. 2, 2017

(87) PCT Pub. No.: WO2016/088653
PCT Pub. Date: Jun. 9, 2016

(65) Prior Publication Data
US 2017/0350614 A1    Dec. 7, 2017

(30) Foreign Application Priority Data

Dec. 5, 2014   (JP) ................................. 2014-247350

(51) Int. Cl.
*F24F 11/00* (2018.01)
*F24F 11/77* (2018.01)
(Continued)

(52) U.S. Cl.
CPC ............ *F24F 11/77* (2018.01); *F24F 1/0014* (2013.01); *F24F 11/36* (2018.01); *F24F 11/74* (2018.01);
(Continued)

(58) Field of Classification Search
CPC .......... F24F 1/0014; F24F 11/36; F24F 11/74; F24F 11/77
See application file for complete search history.

(56) References Cited

U.S. PATENT DOCUMENTS

2002/0178738 A1* 12/2002 Taira ..................... F25B 49/005
62/129
2013/0098576 A1    4/2013 Fujitaka et al.

FOREIGN PATENT DOCUMENTS

| CN | 102162658 A | 8/2011 |
|---|---|---|
| CN | 102269447 A | 12/2011 |

(Continued)

OTHER PUBLICATIONS

Extended European Search Report dated Jul. 23, 2018 in corresponding European Patent Application No. 15864716.4.

*Primary Examiner* — Keith M Raymond
*Assistant Examiner* — Nael N Babaa
(74) *Attorney, Agent, or Firm* — Birch, Stewart, Kolasch & Birch, LLP (57) ABSTRACT

When refrigerant gas leaks in an indoor unit, the leaked refrigerant gas locally accumulates in an area of the indoor space.
This air conditioner includes an indoor unit having one or more outlets, and an outdoor unit connected to the indoor unit, wherein a flammable refrigerant or a mildly flammable refrigerant is used. The air conditioner includes a refrigerant gas sensor disposed in the indoor unit. When refrigerant gas is detected by the refrigerant gas sensor, a control is performed such that air is blown from the one or more outlets at a minimum air speed or higher, said minimum air speed being preset in accordance with the rated cooling capacity of the air conditioner.

4 Claims, 8 Drawing Sheets

(51) Int. Cl.
  *F24F 11/74* (2018.01)
  *F24F 11/89* (2018.01)
  *F25B 49/02* (2006.01)
  *F25B 1/00* (2006.01)
  *F24F 11/36* (2018.01)
  *F24F 1/0014* (2019.01)
  *F24F 1/0003* (2019.01)

(52) U.S. Cl.
  CPC ............... *F24F 11/89* (2018.01); *F25B 1/00* (2013.01); *F25B 49/02* (2013.01); *F24F 1/0003* (2013.01)

(56) References Cited

FOREIGN PATENT DOCUMENTS

| | | |
|---|---|---|
| JP | 11-159924 A | 6/1999 |
| JP | 2000-081258 A | 3/2000 |
| JP | 2002-048382 A | 2/2002 |
| JP | 2002-098346 A | 4/2002 |
| JP | 2005-069652 A | 3/2005 |
| JP | 2012-013348 A | 1/2012 |
| JP | 2013-122364 A | 6/2013 |
| JP | 2014-092317 A | 5/2014 |

* cited by examiner

FIG.7A  UPPER OUTBLOW

FIG.7B  LOWER OUTBLOW

FIG.7C  UPPER/LOWER OUTBLOW

FIG.7D  LEFT/RIGHT OUTBLOW

FIG.8

| NUMBER OF TATAMI MATS | 6 TATAMI MATS OR LESS | | 8 TATAMI MATS | | 10 TATAMI MATS | | 12 TATAMI MATS | | 14 TATAMI MATS | | 16 TATAMI MATS | | 18 TATAMI MATS | | 20 TATAMI MATS | | 23 TATAMI MATS | |
|---|---|---|---|---|---|---|---|---|---|---|---|---|---|---|---|---|---|---|
| FLOOR AREA (m²) | 15 | | 17 | | 19 | | 25 | | 28 | | 34 | | 39 | | 43 | | 49 | |
| RATED COOLING CAPACITY (kW) | 2.2 | | 2.5 | | 2.8 | | 3.6 | | 4.0 | | 5.0 | | 5.6 | | 6.3 | | 7.1 | |
| UPPER OUTBLOW | 1.0 | × | 1.1 | × | 1.2 | × | 1.6 | × | 1.8 | × | 2.2 | × | 2.5 | × | 2.8 | × | 3.1 | × |
|  | 1.2 | ○ | 1.3 | ○ | 1.5 | ○ | 1.9 | ○ | 2.2 | ○ | 2.6 | ○ | 3.0 | ○ | 3.3 | ○ | 3.8 | ○ |
| LOWER OUTBLOW | 0.9 | × | 1.0 | × | 1.1 | × | 1.4 | × | 1.6 | × | 2.0 | × | 2.3 | × | 2.5 | × | 2.8 | × |
|  | 1.0 | ○ | 1.2 | ○ | 1.3 | ○ | 1.7 | ○ | 1.9 | ○ | 2.4 | ○ | 2.7 | ○ | 3.0 | ○ | 3.4 | ○ |
| UPPER/LOWER OUTBLOW | 0.8 | × | 0.9 | × | 1.0 | × | 1.3 | × | 1.5 | × | 1.8 | × | 2.1 | × | 2.3 | × | 2.6 | × |
|  | 1.0 | ○ | 1.1 | ○ | 1.2 | ○ | 1.6 | ○ | 1.8 | ○ | 2.2 | ○ | 2.5 | ○ | 2.8 | ○ | 3.1 | ○ |
| LEFT/RIGHT OUTBLOW | 0.6 | × | 0.7 | × | 0.8 | × | 1.0 | × | 1.1 | × | 1.4 | × | 1.6 | × | 1.8 | × | 2.0 | × |
|  | 0.8 | ○ | 0.9 | ○ | 1.0 | ○ | 1.3 | ○ | 1.4 | ○ | 1.7 | ○ | 2.0 | ○ | 2.2 | ○ | 2.5 | ○ |

AIR CONDITIONER

TECHNICAL FIELD

The present invention relates to an air conditioner in which, for example, a flammable refrigerant is used.

BACKGROUND ART

As an air conditioner using a flammable refrigerant, there has traditionally been known an air conditioner whose indoor unit has a refrigerant gas sensor attached thereto.

CITATION LIST

Patent Literature

Patent Literature 1: Japanese Unexamined Patent Publication No. 13348/2012 (Tokukai 2012-13348)

SUMMARY OF INVENTION

Technical Problem

In cases where a refrigerant gas leaks in an indoor unit of a traditional air conditioner, that leaked refrigerant gas locally accumulates in an area within the indoor space. Given this, there is an air conditioner which blows a wind from an outlet of its indoor unit, when a refrigerant gas sensor detects the refrigerant gas while the indoor unit is not in operation, thereby restraining the leaked refrigerant gas from locally accumulating in an area within the indoor space. In such a traditional air conditioner, the air volume from the outlet at a time of detecting the refrigerant gas by the refrigerant gas sensor is determined; however, even if the air conditioner is configured to blow a wind from the outlet of its indoor unit, that air speed of the wind from the outlet of the indoor unit may fall short for sufficiently restraining the local accumulation of the refrigerant gas in an area of the indoor space, if the air conditioner is installed in a large room, for example.

In view of the above problem, it is an object of the present invention to provide an air conditioner capable of sufficiently preventing local accumulation of a refrigerant gas leaked in an indoor unit in an area of an indoor space.

Solution to Problem

A first aspect of the present invention is an air conditioner, including an indoor unit having one or more outlets and an outdoor unit connected to the indoor unit, in which a flammable refrigerant or a mildly flammable refrigerant is used. The air conditioner includes a refrigerant gas sensor provided in the indoor unit, and when the refrigerant gas sensor detects refrigerant gas, a control is performed such that air is blown from the one or more outlets at a minimum air speed or higher, the minimum air speed being preset in accordance with a rated cooling capacity of the air conditioner.

In this air conditioner, when the refrigerant gas sensor detects the refrigerant gas, air is blown out from the one or more outlets at a minimum air speed or higher, the minimum air speed being preset according to the rated cooling capacity of the air conditioner. Therefore, when there is a leakage of the refrigerant gas in the indoor unit, it is possible to sufficiently prevent local accumulation of the refrigerant gas in an area within the indoor space.

A second aspect of the present invention is the air conditioner of the first aspect, adapted so that the flammable refrigerant or the mildly flammable refrigerant is R32, a mixed refrigerant containing 65 wt % or more of R32, or HFO based mixed refrigerant.

A third aspect of the present invention is the air conditioner of the first or the second aspect, adapted so that an air blowout mode from the one or more outlets of the indoor unit, at a time of detecting the refrigerant gas by the refrigerant gas sensor, is at least one of an upper outblow, a lower outblow, an upper/lower outblow, and a left/right outblow.

A fourth aspect of the present invention is the air conditioner of the third aspect, adapted so that the indoor unit is capable of taking at least two of the upper outblow, the lower outblow, the upper/lower outblow, and the left/right outblow, as the air blowout mode from the one or more outlets at the minimum air speed at a time of detecting the refrigerant gas by the refrigerant gas sensor, and the minimum air speed is determined in advance for each of the air blowout modes from the one or more outlets.

In this air conditioner, the minimum air speed at the one or more outlets when the refrigerant gas sensor detects the refrigerant gas is determined beforehand for each of the air blowout modes from the one or more outlets. Therefore, when there is a leakage of the refrigerant gas in the indoor unit, it is possible to effectively prevent local accumulation of the refrigerant gas in an area within the indoor space.

A fifth aspect of the present invention is the air conditioner of any one of the first to fourth aspects, adapted so that the indoor unit is an on-floor type indoor unit.

This air conditioner includes the on-floor type indoor unit capable of preventing local accumulation of the refrigerant gas in an area nearby the floor of the indoor space.

Advantageous Effects of Invention

As described above, the present invention brings about the following advantageous effects.

In the first to fifth aspects of the present invention, when the refrigerant gas sensor detects the refrigerant gas, air is blown out from the one or more outlets at a minimum air speed or higher, the minimum air speed being preset according to the rated cooling capacity of the air conditioner. Therefore, when there is a leakage of the refrigerant gas in the indoor unit, it is possible to sufficiently prevent local accumulation of the refrigerant gas in an area within the indoor space.

DESCRIPTION OF EMBODIMENTS

The following describes embodiments of an air conditioner related to the present invention, with reference to the drawings.

[Overall Structure of Air Conditioner]

Figure 1:
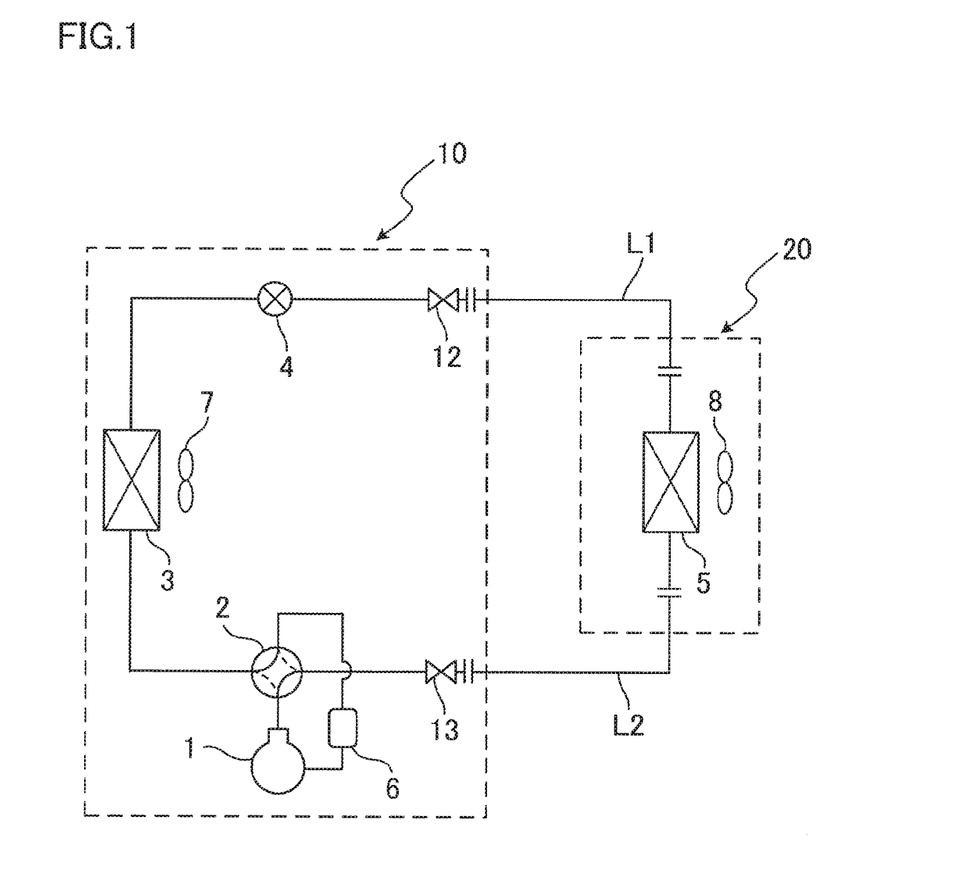
FIG. 1 is a circuit diagram showing a refrigerant circuit of an air conditioner of an embodiment of the present invention.

As shown in FIG. 1, an air conditioner of the present embodiment includes: a compressor 1; a four-pass switching valve 2 whose one end is connected to a discharge side of the compressor 1; an outdoor heat exchanger 3 whose one end is connected to another end of the four-pass switching valve 2; an electric expansion valve 4 whose one end is connected to another end of the outdoor heat exchanger 3; an indoor heat exchanger 5 whose one end is connected to another end of the electric expansion valve 4 via a stop valve 12 and a communication pipe L1; and an accumulator 6 whose one end is connected to another end of the indoor heat exchanger 5 via a stop valve 13, a communication pipe L2, and the four-pass switching valve 2, and whose another end is connected to the sucking side of the compressor 1. The above mentioned compressor 1, the four-pass switching valve 2, the outdoor heat exchanger 3, the electric expansion valve 4, the indoor heat exchanger 5, and the accumulator 6 constitute a refrigerant circuit.

This air conditioner further includes an outdoor fan 7 disposed nearby the outdoor heat exchanger 3, and an indoor fan 8 disposed nearby the indoor heat exchanger 5. The above mentioned compressor 1, the four-pass switching valve 2, the outdoor heat exchanger 3, the electric expansion valve 4, the accumulator 6, and the outdoor fan 7 are disposed in the outdoor unit 10, while the indoor heat exchanger 5 and the indoor fan 8 are disposed in the indoor unit 20.

During a warming operation of the air conditioner, the compressor 1 is activated while switching the four-pass switching valve 2 to a switching position indicated by the solid lines. This causes the high-pressure refrigerant ejected from the compressor 1 to flow into the indoor heat exchanger 5, via the four-pass switching valve 2. The refrigerant condensed in the indoor heat exchanger 5 is decompressed in the electric expansion valve 4, and then flows into the outdoor heat exchanger 3. The refrigerant evaporated in the outdoor heat exchanger 3 returns to the sucking side of the compressor 1 via the four-pass switching valve 2 and the accumulator 6. This way, the refrigerant circulates the refrigerant circuit constituted by the compressor 1, the indoor heat exchanger 5, the electric expansion valve 4, the outdoor heat exchanger 3, and the accumulator 6, thereby carrying out a refrigerating cycle. Then, circulation of the room air by the indoor fan 8 through the indoor heat exchanger 5 warms up the room.

To the contrary, during a cooling operation (including dehumidification operation), the compressor 1 is activated while switching the four-pass switching valve 2 to a switching position indicated by the dotted lines. This causes the high-pressure refrigerant ejected from the compressor 1 to flow into the outdoor heat exchanger 3, via the four-pass switching valve 2. The refrigerant condensed in the outdoor heat exchanger 3 is decompressed in the electric expansion valve 4, and then flows into the indoor heat exchanger 5. The refrigerant evaporated in the indoor heat exchanger 5 returns to the sucking side of the compressor 1 via the four-pass switching valve 2 and the accumulator 6. This executes a refrigerating cycle in which the refrigerant circulates the refrigerant circuit successively in the compressor 1, the outdoor heat exchanger 3, the electric expansion valve 4, the indoor heat exchanger 5, and the accumulator 6. Then, circulation of the room air by the indoor fan 8 through the indoor heat exchanger 5 cools down the room.

In this air conditioner is used a flammable refrigerant. In the present invention, the "flammable refrigerant" encompasses a flammable refrigerant as well as a mildly flammable refrigerant. The air conditioner adopts, for example, an R32 which is a mildly flammable refrigerant, a mixed refrigerant containing 65 wt % or more of the R32, or an HFO (hydrofluoroolefin) based mixed refrigerant; however, it is possible to adopt for example an R290. Further, in this air conditioner is used a refrigerant whose specific weight is heavier than the air.

[Indoor Unit]

As shown in FIG. 2 to FIG. 5, the indoor unit 20 is an on-floor type indoor unit, and includes: a bottom frame 21 in substantially a rectangular parallelpiped shape, whose rear surface side is to be attached to a wall surface of the room; a front grill 22 attached to the front surface side of the bottom frame 21, which has, on its front surface, an opening part 22d in substantially a parallel piped shape; and a front panel 23 attached so as to cover the opening part 22d of the front grill 22. The bottom frame 21, the front grill 22, and the front panel 23 form a casing 20a.

Figure 2:
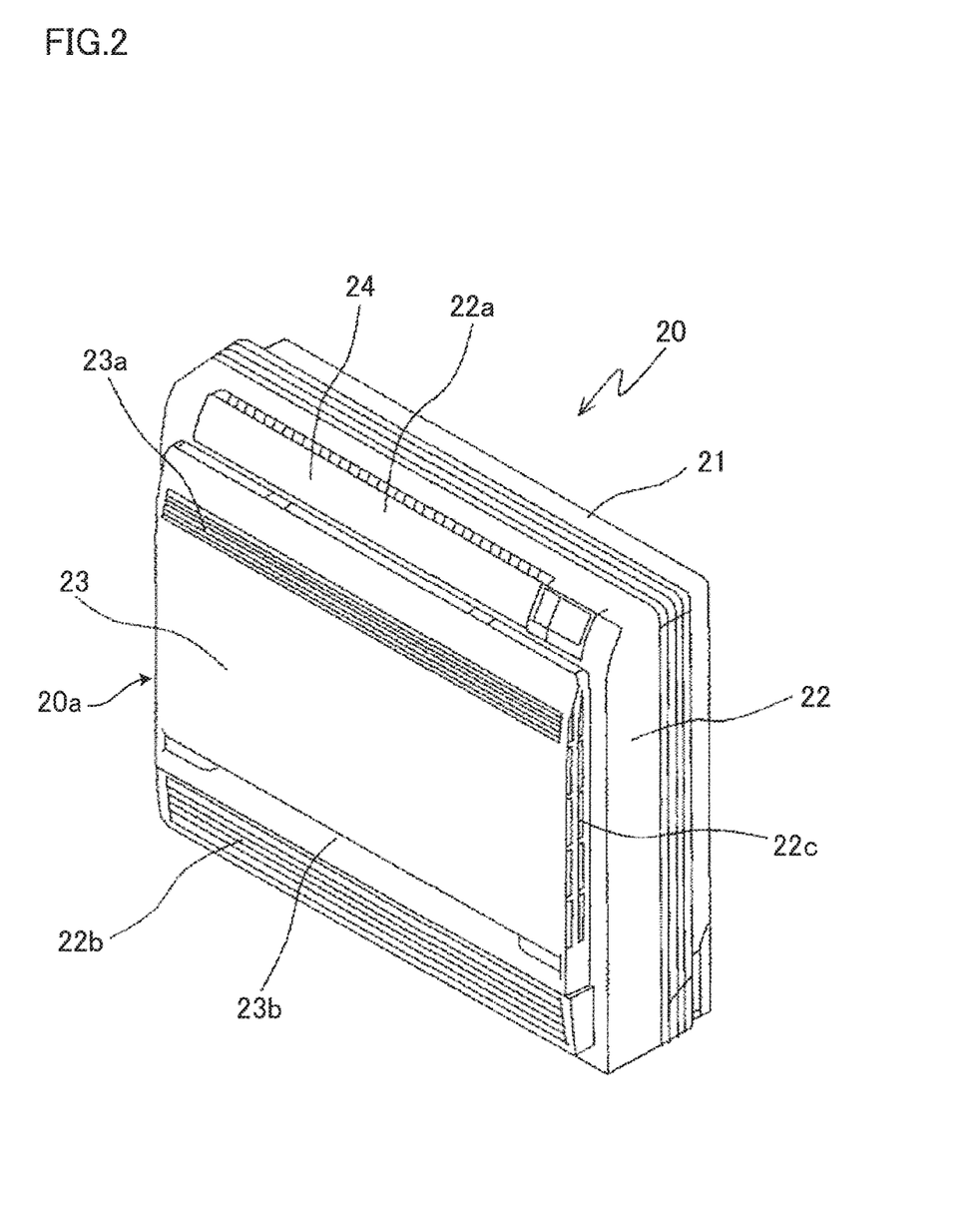
FIG. 2 is a perspective view of the indoor unit of FIG. 1.
Figure 3:
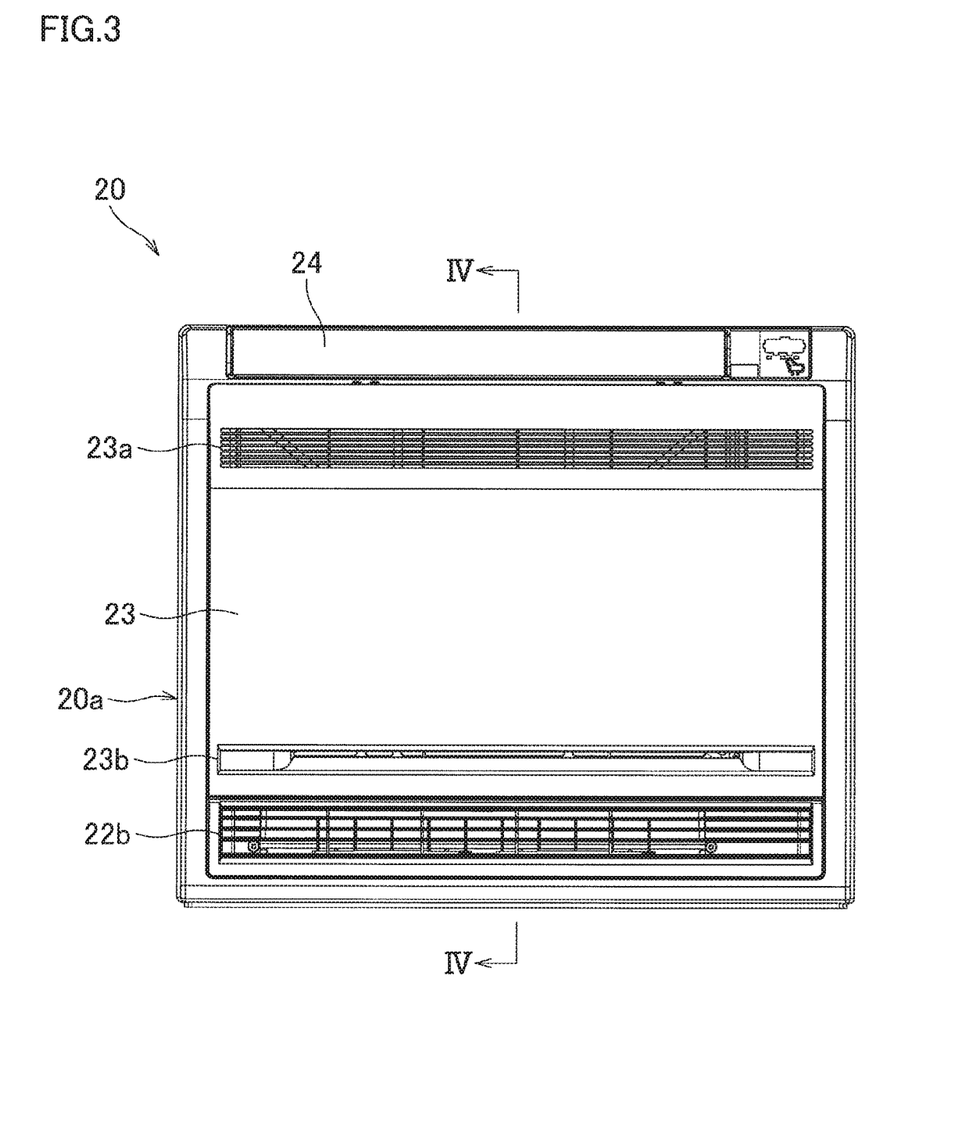
FIG. 3 is a front view of the indoor unit.

In an upper portion of the front grill 22 is provided an upper outlet 22a. In a lower portion of the front grill 22 is provided a lower outlet 22b. An upper outlet path P1 in communication with the upper outlet 22a is provided with a vertical flap 24 configured to change the wind direction of the air flow from the upper outlet 22a relative to a vertical direction; and a horizontal flap 25 configured to change the wind direction of the air flow from the upper outlet 22a relative to a horizontal direction. The vertical flap 24 is connected to a flap motor 24a (see FIG. 6), and the horizontal flap 25 is connected to a flap motor 25a (see FIG. 6). The vertical flap 24, driven by the flap motor 24a, is capable of rotating about a rotational axis extending in a horizontal direction. During the cooling operation or the warming operation, the vertical flap 24 rotates within a vertical wind direction control range shown in FIG. 4, and blows out cool or warm air forward and obliquely upward from the upper outlet 22a. The upper outlet 22a is closed as shown in FIG. 2, while the operation is stopped. The horizontal flap 25, driven by the flap motor 25a, is capable of swinging in horizontal directions. During the cooling operation or the warming operation, the horizontal flap 25 swings within a horizontal wind direction control range, and changes the direction in which cool or warm air is blown out from the upper outlet 22a. The indoor unit 20 of the air conditioner of the present embodiment is configured so that the horizontal wind direction of the upper outlet 22a is switched amongst a frontward direction, a left direction, a right direction, and the horizontal directions.

Figure 4:
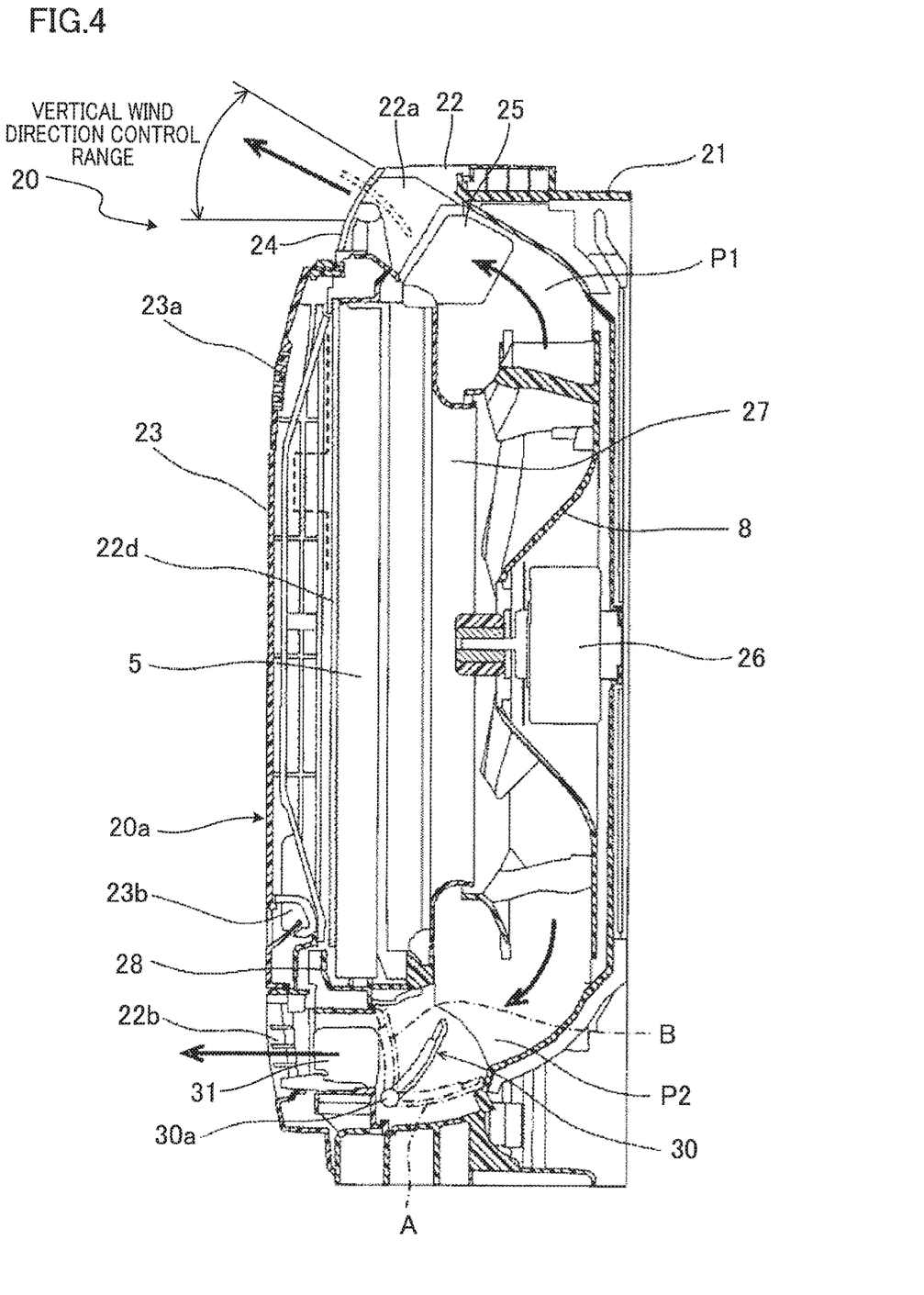
FIG. 4 is a cross sectional view taken at the IV-IV line in FIG. 3.

On the other hand, in a lower outlet path P2 in communication with the lower outlet 22b is disposed a shutter 30 which opens and closes the lower outlet 22b, and the horizontal flap 31 which changes the wind direction of the air flow from the lower outlet path 22b, in relation to the horizontal direction. The shutter 30 is connected to a shutter motor 30b. The shutter 30, driven by the shutter motor 30b, rotates about an axis 30a which extends in a horizontal direction as shown in FIG. 4. This shutter 30 stopping at a position A indicated by a dashed line opens the lower outlet 22b, and closes the lower outlet 22b when stopped at a position B indicated by a dashed line. It should be noted that the horizontal flap 31 is a flap whose direction is manually adjusted. The indoor unit 20 of the air conditioner of the present embodiment is configured so that the horizontal wind direction of the lower outlet 22b is switched amongst a frontward direction, a left direction, a right direction, and the left/right directions (swing in left and right directions).

On each of the side faces on the left and right of the front panel 23 is provided a side outlet 22c (FIG. 2 only illustrates the right side). In each of side outlet paths in communication with the side outlets 22c is disposed a shutter (not shown) which opens and closes the side outlet 22c on the corresponding side. On the upper side of the front panel 23 is provided an upper inlet port 23a. On the lower side of the front panel 23 is provided a lower inlet port 23b.

As shown in FIG. 4, in substantially the center of the bottom frame 21, a fan motor 26 is fixed. The indoor fan 8 to which the shaft of the fan motor 26 is connected is disposed on the bottom frame 21 so that its axis is directed in the front-back directions. The indoor fan 8 is a turbofan which blows out the air, which is sucked from the front surface side, to radially outward with respect to the axis. Further, the bottom frame 21 has a bell-mouth 27 formed on the front surface side of the indoor fan 8. On the front surface side of the bell-mouth 27 is disposed the indoor heat exchanger 5. On the front surface side of the indoor heat exchanger 5 is attached the front grill 22. Further on the front surface side of the front grill 22 is attached the front panel 23. In the openings 22c of the front grill 22 are attached filters.

In this air conditioner, when an operation starts, the fan motor 26 is driven, thus rotating the indoor fan 8. With the rotation of the indoor fan 8, the room air is sucked into the indoor unit 20 via the upper inlet port 23a and the lower inlet port 23b. The room air sucked into the indoor unit 20 is subjected to heat exchanging by the indoor heat exchanger 5, and then blown out from at least one of the upper outlet 22a, the lower outlet 22c and the side outlets 22c. It should be noted that, in the indoor unit 20 of the air conditioner of the present embodiment, the shutter 30 in the lower outlet path P2 opens and closes the lower outlet 22b, and the shutters in the side outlet paths open and close the side outlets 22c.

Figure 5:
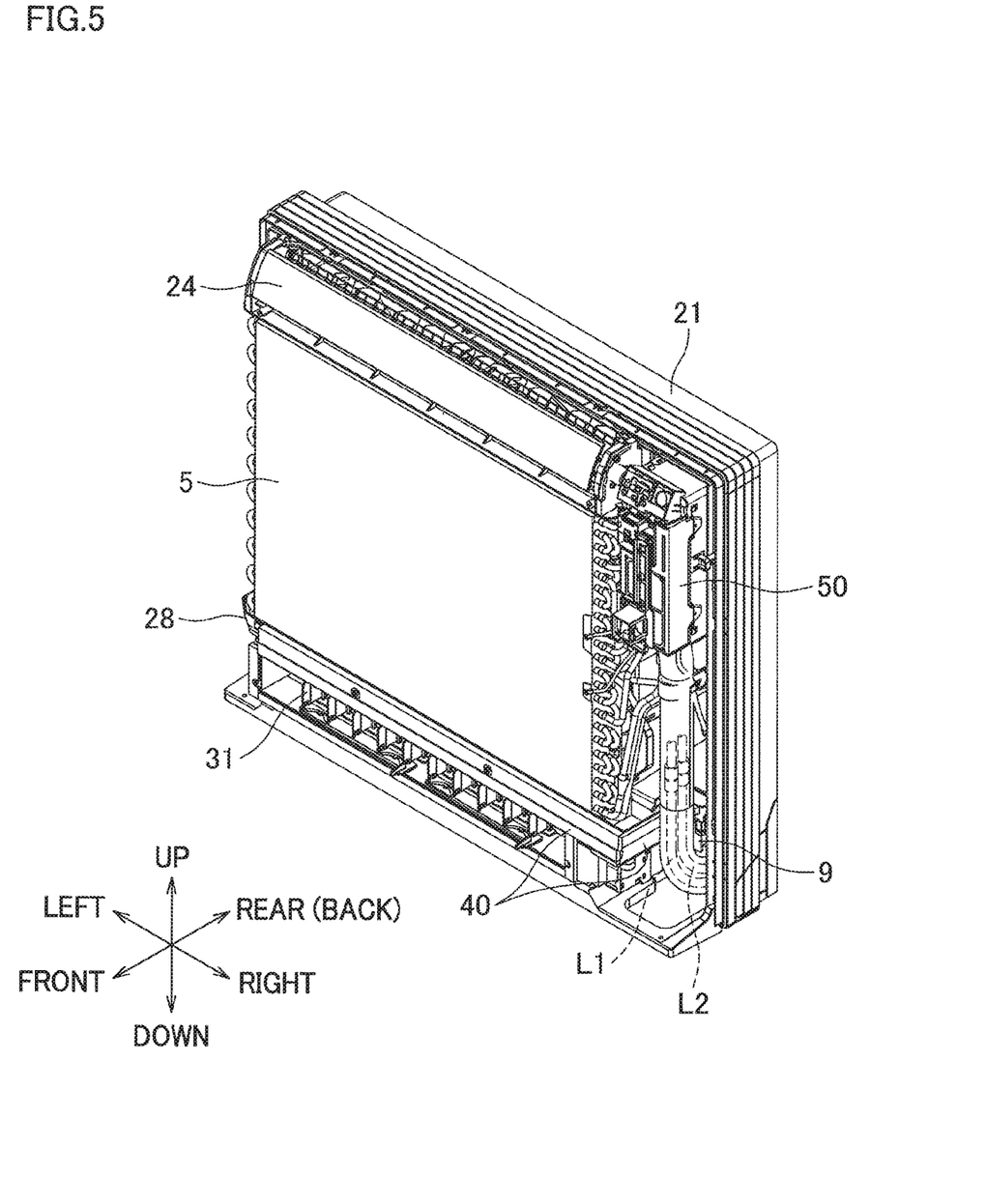
FIG. 5 is a perspective view of the indoor unit from which a front panel is detached.

As shown in FIG. 5, below the indoor heat exchanger 5 is disposed a drain pan 28 which receives and drains condensed water from the air, which is generated by the indoor heat exchanger 5. Further, an electronic component box 50 is disposed on the right outer side (outer side relative to the length), and the above of the indoor heat exchanger 5. Below the electronic component box 50 is attached a refrigerant gas sensor 9 in a detachable manner. This refrigerant gas sensor 9 disposed on the right outer side (outer side relative to the length) of the indoor heat exchanger 5 and the drain pan 28.

In this air conditioner, if the refrigerant gas leaks due to, for example, a damage to the refrigerant pipe of the indoor heat exchanger 5, the refrigerant gas whose specific weight is heavier than the air flows downward, and reaches the drain pan 28. The refrigerant gas having reached the drain pan 28 flows from the left end side to the right end side of the drain pan 28. The refrigerant gas having reached the drain pan 28 then easily overflows from the side of the drain pan 28 close to the refrigerant gas sensor 9 relative to the length. The refrigerant gas overflown accumulates at the bottom of the indoor unit 20, and leaks to the outside from the indoor unit 20.

(Electronic Component Box)

Figure 6:
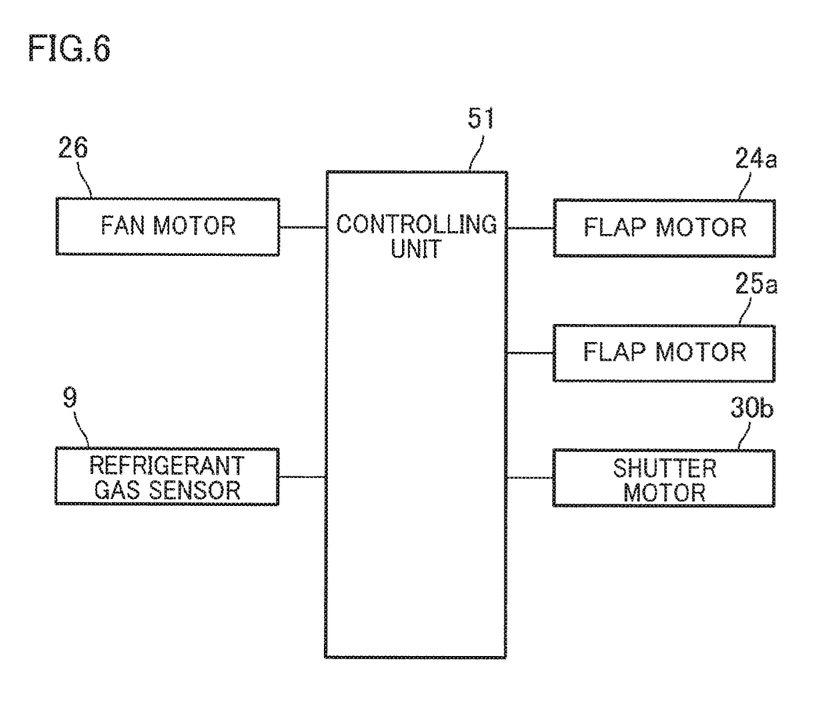
FIG. 6 is a block diagram of a control block of the indoor unit.

The electronic component box 50 accommodates therein the controlling unit 51, and controls the constituting members necessary for cooling and warming operations and the like of the air conditioner. As shown in FIG. 6, the controlling unit 51 (also known as a controller) is connected to the fan motor 26, the refrigerant gas sensor 9, the flap motor 24a, the flap motor 25a, and the shutter motor 30b. The controlling unit 51 controls the indoor fan 8, the vertical flap 24, and the shutter 30, and determines if there is leakage of the refrigerant gas based on the detection result of the refrigerant gas by the refrigerant gas sensor 9.

(Refrigerant Gas Sensor)

The refrigerant gas sensor 9 is a sensor for detecting leaked refrigerant gas, and is disposed at the same level as or lower than the drain pan 28, as shown in FIG. 5. Further, the sensor is disposed on the right outer side (outer side relative to the length) of the drain pan 28, and on a rear side (back side) of the drain pan 28 and the indoor heat exchanger 5.

Figure 7A:
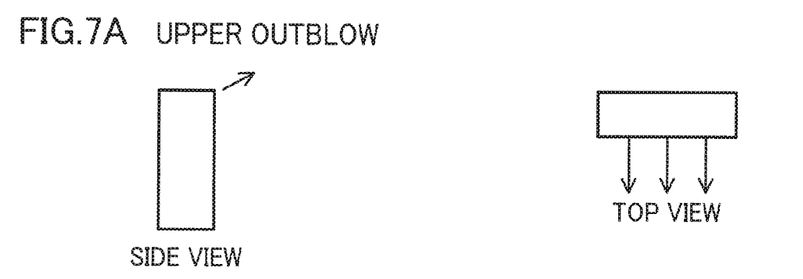
FIG. 7A to 7D are an explanatory diagram for wind direction of the wind blown out from the outlet, when the refrigerant gas sensor detects a refrigerant gas.
Figure 7B:
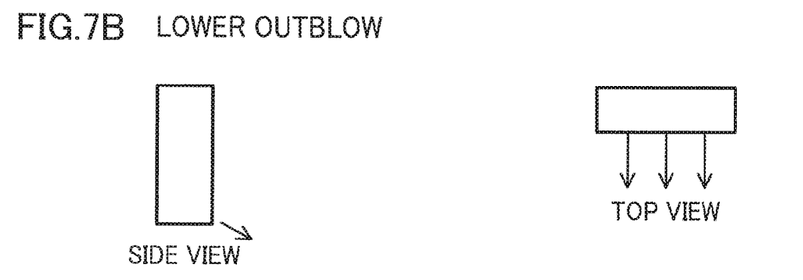
Figure 7C:
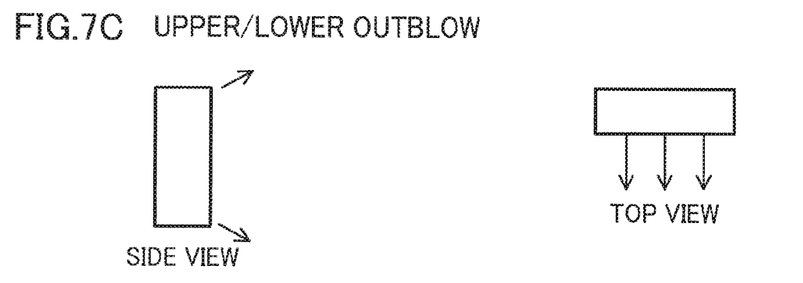
Figure 7D:
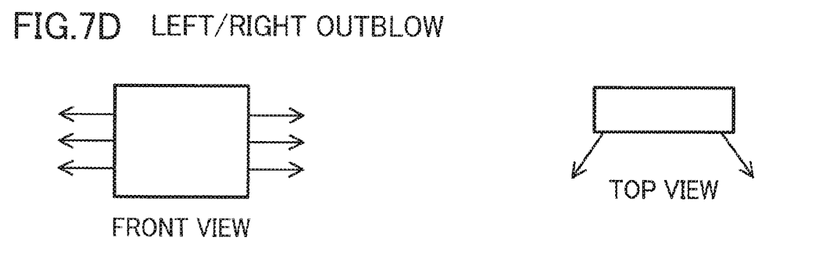

The indoor unit 20 of the air conditioner of the present embodiment takes any of the upper outblow, the lower outblow, the upper/lower outblow, and the left/right outblow as the air blowout mode from the one or more outlets. FIG. 7A to 7C show the air blowout modes from the one or more outlets. On the left side is a side view of the indoor unit to illustrate upper and lower wind directions. On the right side is a top view of the indoor unit illustrating the horizontal wind directions. The direction of airflow from the upper outlet 22a is 20 to 70 degrees upward from a horizontal direction, whereas the direction of the airflow from the lower outlet 22b is substantially horizontal. FIG. 7D shows the air blowout mode from the outlets. On the left side is a front view of the indoor unit to illustrate the horizontal wind directions. On the right side is a top view of the indoor unit illustrating the horizontal wind directions.

<Upper Outblow>: As shown in FIG. 7A, air is blown out in a frontward direction from the upper outlet 22a, while no air is blown out from the lower outlet 22b and from the side outlets 22c.

<Lower Outblow>: As shown in FIG. 7B, no air is blown out from the upper outlet 22a and from the side outlets 22c, while air is blown out in a frontward direction from the lower outlet 22b.

<Upper/Lower Outblow>: As shown in FIG. 7C, air is blown out in a frontward direction from the upper outlet 22a, and air is blown out in a frontward direction from the lower outlet 22b, while no air is blown out from the side outlets 22c.

<Left/Right Outblow>: As shown in FIG. 7D, no air is blown out from the upper outlet 22a and from the lower outlet 22b, while air is blown out in obliquely frontward directions from the side outlets 22c.

An indoor air volume is derived based on the rotation number of the indoor fan. Therefore, by dividing the air volume by the area of outlet (outlet area), the air speed (m/sec) of the wind from the outlet is calculated. The area of the outlet is an area of the upper outlet 22a for the upper outblow, the area of the lower outlet 22b for the lower outblow, the total area of the upper outlet 22a and the lower outlet 22b for the upper/lower outblow, and the total area of the side outlets 22c for the left/right outblow.

In the present embodiment was conducted an evaluation on what air speed (m/sec) of the wind from the outlets sufficiently agitates the air in the indoor space with the indoor unit 20, in cases of detecting the refrigerant gas by the refrigerant gas sensor 9 in the indoor unit 20. In the evaluation, an indoor area (the number of tatami mats) of the space with the indoor unit 20 and the rated cooling capacity (kW) of the air conditioner having the outdoor unit 10 and the indoor unit 20 are changed in various ways, while the air blowout mode from the outlets are varied. For each state, evaluation was conducted as to whether or not the air in the indoor space with the indoor unit 20 is sufficiently agitated. Whether or not the air in the indoor space with the indoor unit 20 is sufficiently agitated is determined based on whether or not a flammable area which is local accumulation of the refrigerant gas is generated in the indoor space. Specifically, the flammable area is an area with the refrigerant concentration of 5% or higher, when the refrigerant is "R290"; or an area with the refrigerant concentration of 10% to 30% when the refrigerant is "R32" or a "refrigerant containing 65% or more of R32". In the present embodiment, the evaluation was conducted with the ventilation conditions of the indoor space including a height of 2.4 m up to the ceiling, a door width of 900 mm, a gap of 3 mm at the top of the door or a gap of 3 mm at the bottom of the door, and a refrigerant gas leaking speed of 10 to 20 kg/hr.

Figure 8:
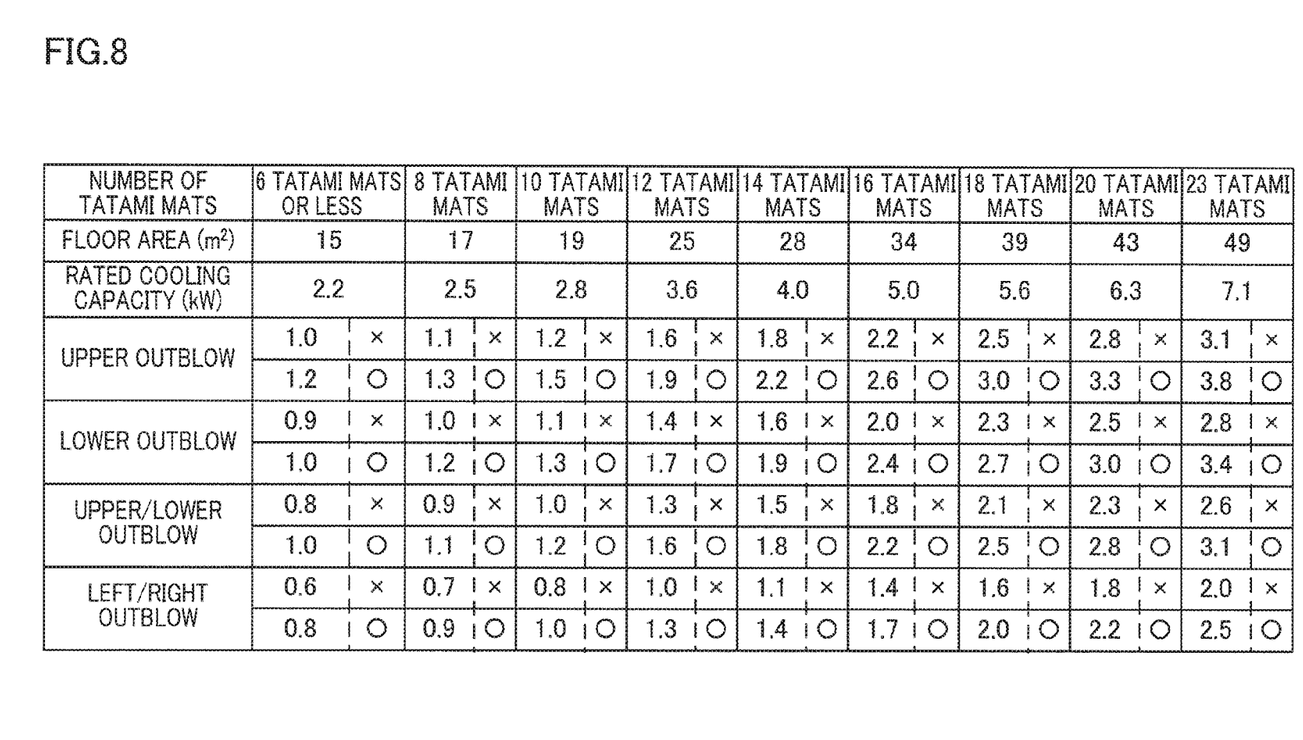
FIG. 8 is a diagram showing an evaluation result of whether or not the air in the indoor space is agitated, when the refrigerant gas is leaked.

FIG. 8 shows evaluation results for each state, on whether or not the air in the indoor space with the indoor unit 20 is sufficiently agitated. In FIG. 8, the circle indicates that the air in the indoor space was sufficiently agitated, while the cross indicates the air in the indoor space was not sufficiently agitated. Of the evaluation results in FIG. 8, the following details, taking as an example, the case where the indoor area equals to 18 tatami mats, the rated cooling capacity (kW) of the air conditioner is 5.6 kW, and the air blowout mode of the wind from the outlets is the upper outblow. The indoor space was not sufficiently agitated when the air speed of the wind from the upper outlet 22a was 2.5 msec. However, when the air speed of the wind from the upper outlet 22a was 3.0 msec, the air in the indoor space was sufficiently agitated. From this, it is understood that the air in the indoor space is sufficiently agitated when the air speed of the wind from the upper outlet 22a is 3.0 msec or higher, in the above conditions. The similar applies to the other states shown in FIG. 8. It should be understood based on the evaluation results of FIG. 8 that, for each indoor area, the rated cooling capacity of the air conditioner, and the air blowout mode from the one or more outlets, the air in the indoor space is sufficiently agitated at an air speed (minimum air speed) or higher, which resulted in the evaluation of sufficient agitation of the air in the indoor space. According to the evaluation results in FIG. 8, the minimum value of the air speed (minimum air speed) for sufficient agitation of the air in the indoor space is 0.8 msec, which is the result of the case where the indoor area is 6 tatami mats, the rated cooling capacity (kW) of the air conditioner is 2.2 kW, and the air blowout mode from the one or more outlets is the left/right outblow.

For example, suppose an air conditioner of the present invention is a model for an indoor area of 18 tatami mats (with the rated cooling capacity being 5.6 kW), and suppose a refrigerant gas is detected by the refrigerant gas sensor 9. In the above condition, if the air conditioner is in the mode of agitating the air in the indoor space by the upper outblow, the air speed of the wind from the upper outlet 22a is set to the minimum air speed of 3.0 msec or higher. If the air conditioner is in the mode of agitating the air in the indoor space by the lower outblow, the air speed of the wind from the lower outlet 22b is set to the minimum air speed of 2.7 msec or higher. If the air conditioner is in the mode of agitating the air in the indoor space by the upper/lower outblow, the air speed of the wind from the upper outlet 22a and the lower outlet 22b is set to the minimum air speed of 2.5 msec or higher. If the air conditioner is in the mode of agitating the air in the indoor space by the left/right outblow, the air speed of the wind from the upper outlet 22a is set to the minimum air speed of 2.2 msec or higher.

For example, an air conditioner designed as a model commonly usable for indoor areas of 10 tatami mats, 12 tatami mats, 14 tatami mats, 16 tatami mats, and 18 tatami mats, the compressor frequency may be changed to change the rated cooling capacity (kW) of the air conditioner according to the indoor area. More specifically, for example, for each of models, different frequencies are determined as the compressor frequency corresponding to the rated cooling capacity (kW). In such an air conditioner, the air volume of the wind from the outlet, at a time of detecting the refrigerant gas by the refrigerant gas sensor 9, may be set constant. If the air conditioner is configured to agitate the air in the indoor space by the upper/lower outblow, the air speed of the wind from the upper outlet 22a and the lower outlet 22b may be set to 2.5 msec or higher, which is the minimum air speed for a case of upper/lower outblow in the indoor area of 18 tatami mats (the rated cooling capacity of the air conditioner is 5.6 kW). This way, the air speed will be the minimum air speed or higher for the upper/lower outblow, even if the air conditioner is used as the model for 10 tatami mats, 12 tatami mats, 14 tatami mats, and 16 tatami mats. Therefore, such an air conditioner requires an air speed of 2.5 msec of the wind from the outlets, for cases of detecting the refrigerant gas by the refrigerant gas sensor 9. However, to sufficiently agitate the air in the indoor space, the air speed higher than the minimum air speed is preferable. An example is to set the air speed of the wind from the outlets for cases of detecting the refrigerant gas by the refrigerant gas sensor 9 to approximately 4.4 msec, when the minimum air speed is 2.5 msec.

[Characteristics of Air Conditioner of the Present Embodiment]

The air conditioner of the present embodiment has the following characteristics.

In the air conditioner of the present embodiment, when the refrigerant gas sensor 9 detects the refrigerant gas, air is blown out from the one or more outlets at a minimum air speed or higher, the minimum air speed being preset according to the rated cooling capacity of the air conditioner. Therefore, when there is a leakage of the refrigerant gas in the indoor unit 20, it is possible to sufficiently prevent local accumulation of the refrigerant gas in an area within the indoor space.

In the air conditioner of the present embodiment, the minimum air speed at the one or more outlets when the refrigerant gas sensor 9 detects the refrigerant gas is determined beforehand for each of the air blowout modes from the one or more outlets. Therefore, when there is a leakage of the refrigerant gas in the indoor unit 20, it is possible to effectively prevent local accumulation of the refrigerant gas in an area within the indoor space.

Thus, the embodiments of the present invention have been described hereinabove. However, the specific structure of the present invention shall not be interpreted as to be limited to the above described embodiments. The scope of the present invention is defined not by the above embodiments but by claims set forth below, and shall encompass the equivalents in the meaning of the claims and every modification within the scope of the claims.

The above described embodiment deals with an indoor unit which is capable of taking any of the upper outblow, the lower outblow, the upper/lower outblow, and the left/right outblow as the air blowout mode from the one or more outlets, when the refrigerant gas is detected by the refrigerant gas sensor. However, the effects of the present invention are brought about, with an indoor unit which takes at least one of the upper outblow, the lower outblow, the upper/lower outblow, and the left/right outblow. This means that the indoor unit may be an indoor unit having only an upper outlet, an indoor unit having only a lower outlet, an indoor unit having only an upper outlet and a lower outlet, or an indoor unit having only side outlets.

INDUSTRIAL APPLICABILITY

Use of the present invention enables prevention of local accumulation of a leaked refrigerant gas in a certain area in an indoor space.

REFERENCE SIGNS LIST

9. Refrigerant Gas Sensor
10. Outdoor Unit
20. Indoor Unit
20a. Casing
22a. Upper Outlet (outlet)
22b. Lower Outlet (outlet)
22c. Side Outlets (outlets)

The invention claimed is:

1. An air conditioner having a rated cooling capacity, the air conditioner comprising:
   an indoor unit having one or more outlets configurable in a plurality of air blowout modes including, with respect to a gravity center of the indoor unit, an upper outblow, a lower outblow, an upper/lower outblow, and a left/right outblow;
   an outdoor unit connected to the indoor unit;
   a refrigerant circuit in which a flammable refrigerant is circulated;
   a refrigerant gas sensor provided in the indoor unit, and
   a controller configured to control, when the refrigerant gas sensor detects refrigerant gas, a speed at which air is blown from the one or more outlets to be a preset minimum air speed or higher based on an air blowout mode of the one or more outlets of the indoor unit at a time of detecting the refrigerant gas by the refrigerant gas sensor, wherein
      the controller is capable of taking at least two of the upper outblow, the lower outblow, the upper/lower outblow, and the left/right outblow, as the air blowout mode from the one or more outlets at the minimum air speed at a time of detecting the refrigerant gas by the refrigerant gas sensor, and
      the minimum air speed is preset in accordance with a rated cooling capacity of the air conditioner, and the air blowout mode from the one or more outlets such that the minimum air speed differs depending on the air blowout mode active at the time of detecting the refrigerant gas.

2. The air conditioner, according to claim 1, wherein the flammable refrigerant is R32, a mixed refrigerant containing 65 wt % or more of R32, or HFO based mixed refrigerant.

3. The air conditioner, according to claim 1, wherein the indoor unit is an on-floor type indoor unit.

4. The air conditioner, according to claim 2, wherein the indoor unit is an on-floor type indoor unit.

* * * * *